(12) United States Patent
Peterson et al.

(10) Patent No.: US 8,713,327 B1
(45) Date of Patent: Apr. 29, 2014

(54) CIRCUIT FOR AND METHOD OF ENABLING COMMUNICATION OF CRYPTOGRAPHIC DATA

(75) Inventors: Edward S. Peterson, Rio Rancho, NM (US); Jason J. Moore, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 735 days.

(21) Appl. No.: 12/364,030

(22) Filed: Feb. 2, 2009

(51) Int. Cl.
*G06F 11/30* (2006.01)
*G06F 21/72* (2013.01)

(52) U.S. Cl.
CPC ...................................... *G06F 21/72* (2013.01)
USPC ............... 713/191; 713/189; 713/190; 726/8; 326/8

(58) Field of Classification Search
CPC ......... G06F 21/72; G06F 21/71; G06F 21/70; H04L 65/00
USPC ................. 713/153, 166, 189–191; 326/39, 8; 726/8
See application file for complete search history.

(56) References Cited

U.S. PATENT DOCUMENTS

| | | | | |
|---|---|---|---|---|
| 5,698,992 | A * | 12/1997 | El Ayat et al. ................... | 326/41 |
| 7,343,579 | B2 * | 3/2008 | Coxe et al. ..................... | 716/101 |
| 7,519,831 | B2 * | 4/2009 | LeQuere ....................... | 713/189 |
| 2006/0133604 | A1 * | 6/2006 | Buer et al. ...................... | 380/28 |
| 2007/0103193 | A1 * | 5/2007 | Reblewski et al. ............. | 326/41 |
| 2007/0118876 | A1 * | 5/2007 | Singh et al. ..................... | 726/2 |
| 2007/0176631 | A1 * | 8/2007 | Bakker et al. ................... | 326/41 |
| 2007/0245141 | A1 * | 10/2007 | O'Keeffe et al. ............. | 713/164 |
| 2007/0245413 | A1 * | 10/2007 | Andolina et al. ................ | 726/11 |
| 2009/0060197 | A1 * | 3/2009 | Taylor et al. ................... | 380/277 |
| 2009/0119773 | A1 * | 5/2009 | D'Amore et al. ............... | 726/21 |
| 2009/0128186 | A1 * | 5/2009 | Balasubramanian et al. .. | 326/38 |
| 2010/0077226 | A1 * | 3/2010 | Senga et al. ................... | 713/189 |
| 2010/0125739 | A1 * | 5/2010 | Creary et al. .................. | 713/189 |
| 2010/0142371 | A1 * | 6/2010 | Gooch et al. .................... | 370/229 |

OTHER PUBLICATIONS

McLean et al., "FPGA-Based Single Chip Cryptographic Solution (U)", Military Embedded Systems, Mar. 2007, pp. 34-37, [Retrieved from Internet Jun. 7, 2011], "www.mil-embedded.com/pdfs/NSA.Mar07.pdf".*
General Dynamics, "Programmable Objective Encryption Technologies Advanced Cryptographic Module", General Dynamics C4 Systems, [Retrieved from Internet Nov. 21, 2011], "http://www.gdc4s.com/documents/GD-POET-w2.pdf".*

(Continued)

*Primary Examiner* — Christopher Brown
*Assistant Examiner* — Roderick Tolentino
(74) *Attorney, Agent, or Firm* — John J. King; Lois D. Cartier (57) ABSTRACT

A circuit for enabling communication of cryptographic data in an integrated circuit is disclosed. The circuit comprises a first interface coupled to receive data having a first security level; a second interface coupled to receive data having a second security level; a cryptographic application; and a routing block coupled between the first and second interfaces and the cryptographic application, the routing block comprising configurable logic, wherein the routing block is configurable to selectively route the data having the first security level by way of the first interface and to route data having the second security level by way of the second interface. A method of enabling communication of cryptographic data in an integrated circuit is also disclosed.

17 Claims, 8 Drawing Sheets

(56) References Cited

OTHER PUBLICATIONS

General Dynamics, "Technical Requirements Document for the Programmable Objective Encryption Technologies Advanced Cryptographic Module", General Dynamics C4 Systems, [Retrieved from Internet Nov. 21, 2011], "http://cryptome.org/poet-acm.htm".*

Pereira et al., "SSDR—Reconfigurable Firewall: Reconfiguration Model Impact", 2008, IEEE pp. 93-97.*

Zeineddini et al., "Secure Partial Reconfiguration of FPGAs", 2005, IEEE, pp. 155-162.*

McLean, Mark et al., "FPGA-Based Single Chip Cryptographic Solution (U)," *Military Embedded Systems*, Mar. 2007, pp. 34-37.

* cited by examiner

CIRCUIT FOR AND METHOD OF ENABLING COMMUNICATION OF CRYPTOGRAPHIC DATA

FIELD OF THE INVENTION

The present invention relates generally to integrated circuits, and in particular, to a circuit for and a method of enabling communication of cryptographic data.

BACKGROUND OF THE INVENTION

Cryptography is a central part of information security and related issues, such as authentication and access control. Cryptography also contributes to computer science, and particularly the techniques used in computer and network security for information confidentiality. Cryptography is also used in many applications encountered by individuals on a regular basis, such as security of ATM cards, computer passwords, and electronic commerce. Applications for implementing cryptography are often referred to as Cryptographic Equipment Applications (CEAs), or more generally cryptographic applications. However, cryptography also creates a number of challenges when implemented in a given device or system.

In embedded programmable cryptographic solutions, it is often necessary to rely on a trusted Secure Operating System (SOS) to provide preemptive time and space partitioning in order to control and/or restrict information flow between portions of circuit having different security levels. However, the evaluation of the trusted operating system software may be difficult, time consuming, and very expensive. In order to adhere to various user requirements, the use of programmable cryptographic solutions is strongly encouraged due to their flexibility, their ability to be reprogrammed, and their reduced cost to upgrade the cryptographic solution.

SUMMARY OF THE INVENTION

A circuit for enabling communication of cryptographic data in an integrated circuit is disclosed. The circuit comprises a first interface coupled to receive data having a first security level; a second interface coupled to receive data having a second security level; a cryptographic application; and a routing block coupled between the first and second interfaces and the cryptographic application, the routing block comprising configurable logic, wherein the routing block is configurable to selectively route the data having the first security level by way of the first interface and to route data having the second security level by way of the second interface. The circuit may further comprise a second cryptographic application, wherein the routing block is coupled between the first and second interfaces and the second cryptographic application. The first and second cryptographic applications may comprise partial reconfiguration modules implemented in configurable logic of the programmable logic device. The circuit may further comprise a barrier around the first and second cryptographic applications, wherein the barrier prevents signals from being transmitted to the first and second cryptographic applications other than through the secure interface or the non-secure interface.

According to an alternate embodiment, a circuit for enabling communication of cryptographic data in an integrated circuit comprises a cryptographic application comprising a first interface receiving data having a first security level and a second interface receiving data having a second security level; interconnect elements coupled to the first interface and the second interface; and a routing block coupled to the first interface and the second interface of the cryptographic application, the routing block comprising an interconnect crossing, wherein the interconnect elements coupled to the first interface and the second interface of the cryptographic application are configured to cross at a predetermined location of the routing block to improve isolation. The interconnect elements coupled to the first interface and the interconnect elements coupled the second interface are configured on different metal layers and/or may be configured to cross in the routing block perpendicular to one another. The circuit may further comprise a plurality of enable signals for enabling an interconnect element coupled to a secure interface of one cryptographic application of the plurality of cryptographic applications.

A method of enabling communication of cryptographic data in an integrated circuit is also disclosed. The method comprises configuring a first portion of programmable logic as a cryptographic application having a first interface coupled to receive data having a first security level and a second interface coupled to receive data having a second security level; configuring a second portion of programmable logic as a routing block coupled the cryptographic application, the routing block enabling a connection to the first interface; and transforming the configuration of the second portion of the programmable logic to a routing block enabling a connection to the second interface. Transforming the configuration of the second portion of the programmable logic may comprise reconfiguring the routing block implemented in programmable logic, and particularly reconfiguring the routing block from an interface for non-secure data to an interface for secure data. Transforming the configuration of the second portion of the programmable logic may comprise controlling enable signals coupled to the first cryptographic application and the second cryptographic application.

DETAILED DESCRIPTION

Figure 1:
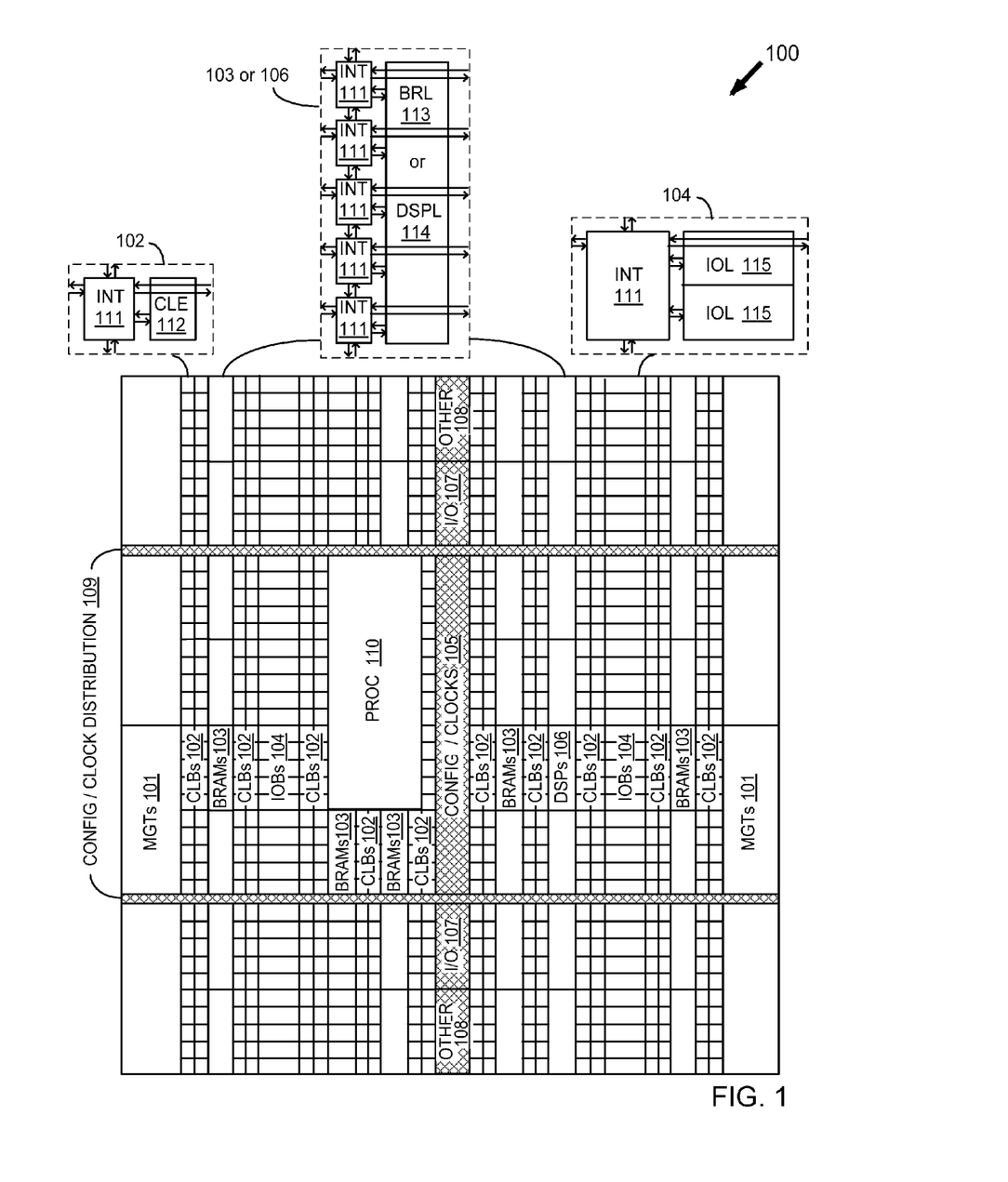
FIG. 1 is a block diagram of a device having programmable logic according to an embodiment the present invention.

Turning first to FIG. 1, a block diagram of a device having programmable logic according to an embodiment the present invention is shown. While devices having programmable logic may be implemented in any type of integrated circuit device, such as an application specific integrated circuit (ASIC) having programmable logic, other devices comprise dedicated programmable logic devices. A programmable logic device (PLD) is an integrated circuit device designed to be user-programmable so that users may implement logic designs of their choices. One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., flash memory, as in some CPLDs), or in any other type of memory cell.

The device of FIG. 1 comprises an FPGA architecture 100 having a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 may include a configurable logic element (CLE 112) that may be programmed to implement user logic plus a single programmable interconnect element (INT 111). A BRAM 103 may include a BRAM logic element (BRL 113) in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 106 may include a DSP logic element (DSPL 114) in addition to an appropriate number of programmable interconnect elements. An IOB 104 may include, for example, two instances of an input/output logic element (IOL 115) in addition to one instance of the programmable interconnect element (INT 111). The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor. As will be described in more detail below, the interconnect elements enable secure and non-secure data paths associated with a CEA routing block coupled to one or more CEAs.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Some FPGAs utilizing the architecture illustrated in FIG. 1 include additional logic blocks that disrupt the regular columnar structure making up a large part of the FPGA. The additional logic blocks may be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic.

Figure 2:
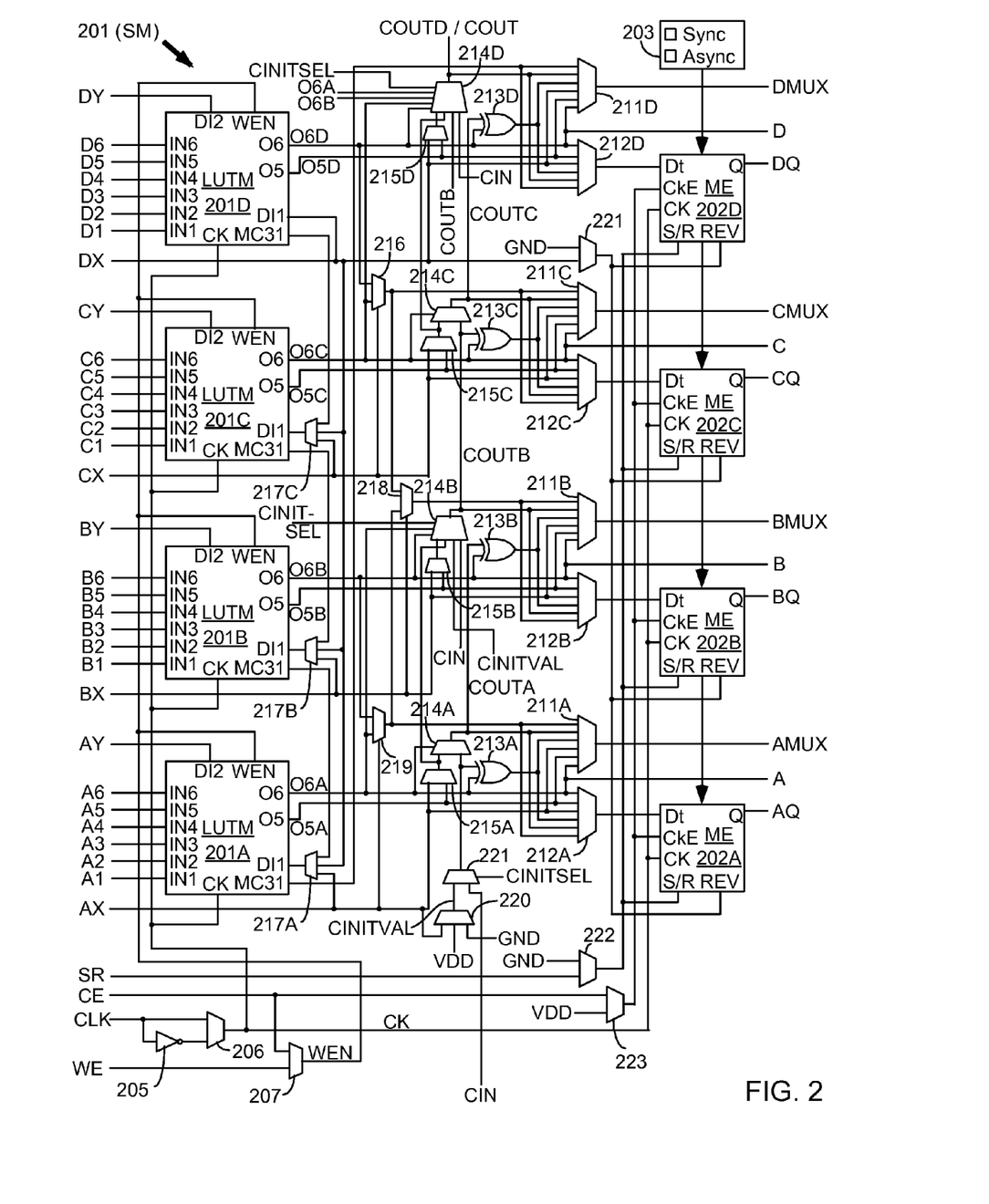
FIG. 2 is a block diagram of a configurable logic block of the device of FIG. 1 according to an embodiment of the present invention.

Turning now to FIG. 2, a block diagram of a configurable logic block of the device of FIG. 1 according to an embodiment of the present invention is shown. In particular, FIG. 2 illustrates in simplified form a configurable logic element of a configuration logic block 102 of FIG. 1. In the embodiment of FIG. 2, slice M 201 includes four lookup tables (LUTMs) 201A-201D, each driven by six LUT data input terminals A1-A6, B1-B6, C1-C6, and D1-D6 and each providing two LUT output signals O5 and O6. The O6 output terminals from LUTs 201A-201D drive slice output terminals A-D, respectively. The LUT data input signals are supplied by the FPGA interconnect structure via input multiplexers, which may be implemented by programmable interconnect element 211, and the LUT output signals are also supplied to the interconnect structure. Slice M also includes: output select multiplexers 211A-211D driving output terminals AMUX-DMUX; multiplexers 212A-212D driving the data input terminals of memory elements 202A-202D; combinational multiplexers 216, 218, and 219; bounce multiplexer circuits 222-223; a circuit represented by inverter 205 and multiplexer 206 (which together provide an optional inversion on the input clock path); and carry logic comprising multiplexers 214A-214D, 215A-215D, 220-221 and exclusive OR gates 213A-213D. All of these elements are coupled together as shown in FIG. 2. Where select inputs are not shown for the multiplexers illustrated in FIG. 2, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 2 for clarity, as well as from other selected figures herein.

In the pictured embodiment, each memory element 202A-202D may be programmed to function as a synchronous or asynchronous flip-flop or latch. The selection between synchronous and asynchronous functionality is made for all four memory elements in a slice by programming Sync/Asynch selection circuit 203. When a memory element is programmed so that the S/R (set/reset) input signal provides a set function, the REV input terminal provides the reset function. When the memory element is programmed so that the S/R input signal provides a reset function, the REV input terminal provides the set function. Memory elements 202A-202D are clocked by a clock signal CK, which may be provided by a global clock network or by the interconnect structure, for example. Such programmable memory elements are well known in the art of FPGA design. Each memory element 202A-202D provides a registered output signal AQ-DQ to the interconnect structure. Because each LUT 201A-201D provides two output signals, O5 and O6, the LUT may be configured to function as two 5-input LUTs with five shared input signals (IN1-IN5), or as one 6-input LUT having input signals IN1-IN6.

In the embodiment of FIG. 2, each LUTM 201A-201D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 217A-217C for LUTs 201A-201C), or to the two 32-bit RAMs via input terminals DI1 and DI2. RAM write operations in the LUT RAMs are controlled by clock signal CK from multiplexer 206 and by write enable signal WEN from multiplexer 207, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 201A may also be provided to the general interconnect structure for shift register chaining, via output select multiplexer 211D and CLE output terminal DMUX. The devices having programmable logic and methods of the present invention may be implemented according to the device of FIGS. 1 and 2, or in any device, including any type of integrated circuit having programmable logic.

Figure 3:
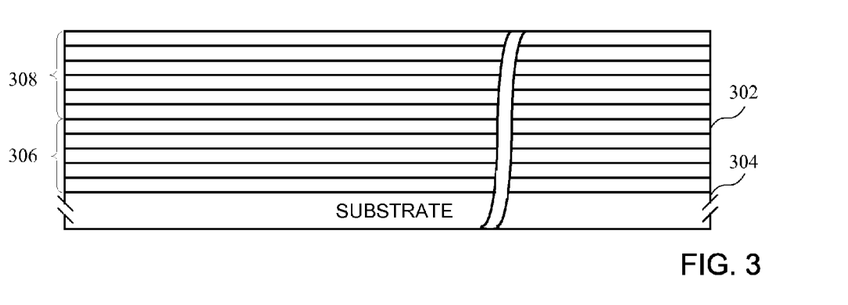
FIG. 3 is a cross-sectional view of the device of FIG. 1 according to an embodiment of the present invention.

Turning now to FIG. 3, a cross-sectional view of the device of FIG. 1 according to an embodiment of the present invention is shown. In particular, a plurality of metal layers 302 are formed on a substrate 304 having circuit elements as described in FIGS. 1 and 2. The metal layers may comprise interconnect elements and may be used to route different signals. For example, the first 5 layers 306 may comprise conductors used for connecting circuit elements within the various functional blocks, such as BRAM or CLBs of a programmable logic device, while the interconnect circuits used for connecting the various functional blocks may be positioned on the upper six layers 308. Even layers of the interconnect layers could be used to route signals in a longitudinal direction across the top of the substrate, while odd layers could be used to route signals in a lateral direction for example. As will be described in more detail below, interconnect elements may be selectively employed to improve the security of data transmitted in an integrated circuit implementing a cryptographic algorithm.

Figure 4:
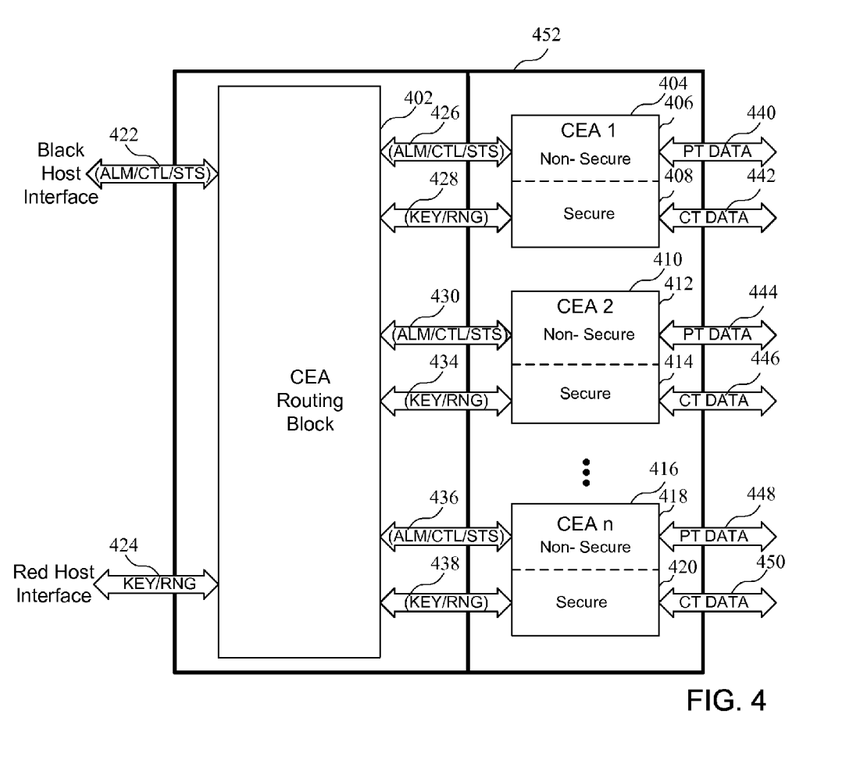
FIG. 4 is a block diagram of a circuit enabling the communication of cryptographic data in an integrated circuit according to an embodiment of the present invention.

Turning now to FIG. 4, a block diagram of a circuit enabling the communication of cryptographic data in an integrated circuit according to an embodiment of the present invention is shown. According to the embodiment of FIG. 4, a CEA routing block 402 provides a pathway from a "red" host interface comprising a key management sub-system having a secure or sensitive "red" data path and from a "black" host interface having a non-secure or non-sensitive "black" data path. The CEA routing block as well as the CEAs themselves may be implemented in programmable logic, as will be described in more detail below. It can be seen that the CEA routing block must not only keep secure data associated with CEAs separate, but it also provides separation between key management data and black host data. While the following description of circuits for enabling communication of cryptographic data relates to secure or "red" data and non-secure or "black" data, the circuits and methods of the present invention may be employed with more than two types of data. Further, the data may vary in levels of security other than secure or non-secure. That is, both data may be secure signals, but may have a different level of security, where a first type of data has a first level of security and a second type of data has a second level of security. The specific references to secure and non-secure data are given by way of example as one combination of data having different levels of security.

According to one aspect of the circuit of FIG. 4, the CEA routing block 402 provides hardware separation between secure and non-secure data paths. The circuit of FIG. 4 uses (n+1) unique partial reconfiguration (PR) modules, where n is the number of CEAs present in the system. In particular, a first CEA 404 comprises a non-secure portion 406 and a secure portion 408, a second CEA 410 comprises a non-secure portion 412 and a secure portion 414, and an n-th CEA 416 comprises a non-secure portion 418 and a secure portion 420. Each of the CEAs communicates data by way of the CEA routing block. A data path 422 provides non-secure data, such as alarm, control and status signals, by way a black host interface, while a data path 424 provides secure data, such as cryptographic keys or randomizer data, by way of a red host interface. The red host interface may comprise a key management system enabling the communication of cryptographic keys or other secure data of a cryptographic application to a CEA by way of the CEA routing block. Connections are also provided between the CEA routing block and the CEAs. In particular, a non-secure data path 426 is provided to the non-secure portion 406 of the first CEA, while a secure data path 428 is provided to the secure portion 408. Similarly, a non-secure data path 430 is provided to the non-secure portion 412 of the second CEA, while a secure data path 434 is provided to the secure portion 414. Finally, a non-secure data path 436 is provided to the non-secure portion 418 of the n-th CEA, while a secure data path 438 is provided to the secure portion 420.

Each of the CEAs may also provide cipher text (CT) data and plain text (PT) data by way of data paths to other portions of the device. In particular, a data path 440 couples plain text data from the non-secure portion 406 of the first CEA to other portions of the device, while a data path 442 couples cipher text from the secure portion 408 to other portions of the device. A data path 444 couples plain text data from the non-secure portion 412 of the second CEA to other portions of the device, while a data path 446 couples cipher text from the secure portion 414 to other portions of the device. A data path 448 couples plain text data from the non-secure portion 418 of the n-th CEA to other portions of the device, while a data path 450 couples cipher text from the secure portion 420 to other portions of the device. The various data paths comprising interfaces to or from the CEA routing block or a CEA may be implemented using interconnect elements of the circuit of FIG. 1, for example.

Finally, a barrier 452 is provided around the CEA routing block and the CEAs as shown in FIG. 4. In particular, the barrier 452 prevents any data other than data sent by way of the various data paths shown in FIG. 4 to be sent to or from the CEA routing block or a CEA. When implemented in a device having programmable logic, such as the device of FIG. 1 for example, the barrier may be provided by the use of unused configurable logic blocks, where the interconnect elements of those configurable logic blocks are selected to prevent any data from passing through the configurable logic blocks.

According to one embodiment of the invention, the circuit of FIG. 4 enables "swapping" CEA routing blocks to provide connectivity between portions of the embedded cryptographic system, where any given CEA routing block provides only one particular pathway. For example, the CEA routing block 402 may be implemented in one or more configurable logic blocks which may be reconfigured in a partial reconfiguration of the device to implement a different CEA routing block. While all of the data paths 426-438 are shown in FIG. 4, only some of the data paths may be implemented depending upon the CEA routing block which is implemented. The default CEA routing block preferably enables communication with the black host interface and connects to all CEAs simultaneously as shown for example in FIG. 5. That is, the data path 502 comprises programmable interconnects which couples the host interface to the non-secure portion of each of the CEAs. The data path 502 may communicate common signals to each of the CEAs or may comprise a bus for separately addressing the CEAs to send different non-secure signals to the CEAs.

Figure 6:
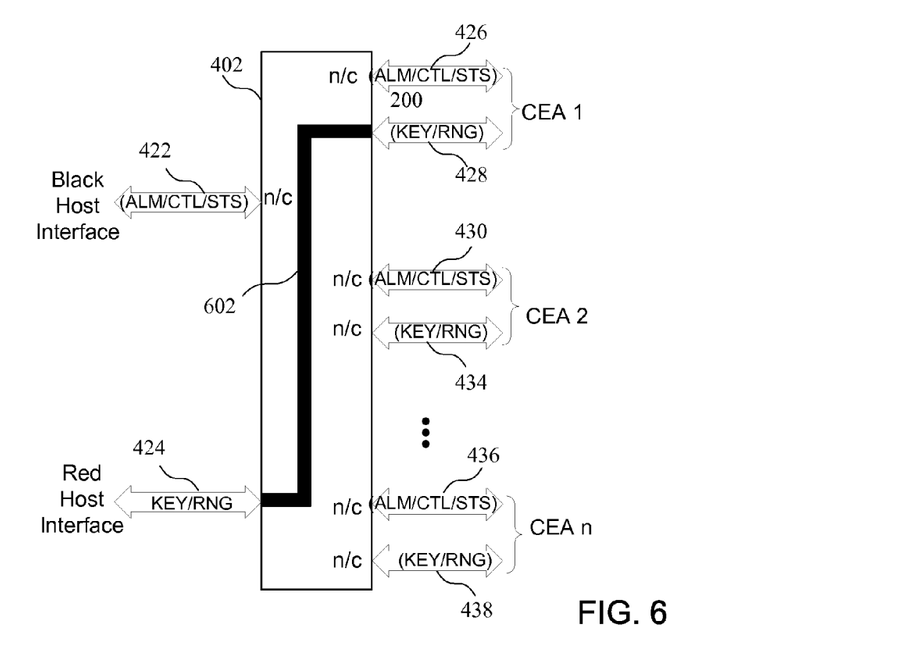
FIG. 6 is a block diagram showing a configuration of the circuit of FIG. 4 enabling secure communication with a first selected cryptographic module according to an embodiment the present invention.

In addition to the default CEA routing block, a unique CEA routing block may be selectively implemented for each of the "n" CEAs. When it is necessary to provide keys or other cryptographic information to a particular CEA using a secure data path, then an appropriate CEA routing block enabling secure data to be transmitted to a selected CEA is then loaded in. As shown in FIG. 6 for example, a data path 602 enables the transfer of secure data to the first CEA. The loading of the CEA routing block may be performed by a configuration controller of the device implementing the CEAs during a partial reconfiguration process, for example. Once the transfers of the secure data is complete, other secure data may be transferred to another CEA after a different CEA routing block is loaded, such as by way of the data path 702 of the CEA routing block of FIG. 7 enabling routing secure data to the second CEA. When secure data is not being transferred to a CEA, the default CEA routing block may then be re-loaded.

Figure 7:
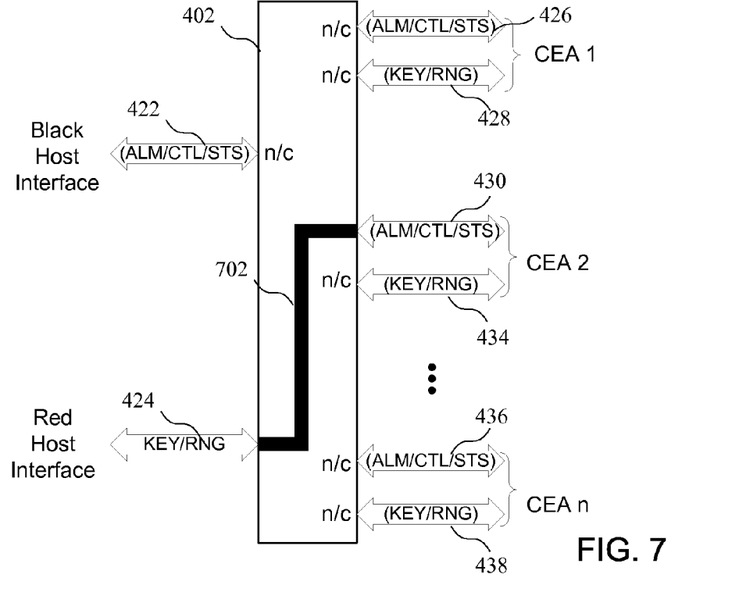
FIG. 7 is a block diagram showing a configuration of the circuit of FIG. 4 enabling secure communication with a second selected cryptographic module according to an embodiment of the present invention.

While the data paths 602 and 702 of FIGS. 6 and 7 each show a data path to a single CEA, it is contemplated that a secure data path may be provided to more than one CEA. By utilizing Field Programmable Gate Arrays (FPGAs) as the core element of a crypto system, the evaluation of a trusted operating systems may be greatly simplified because the separation analysis may now be concentrated in the reconfigurable hardware. That is, the evaluation of hardware is much simpler, better understood, and may be performed in a shorter time frame. Accordingly, the implementation of the cryptographic system in a device having programmable logic provides a considerable cost savings to both the cryptographic system developer and the system implementer.

Figure 5:
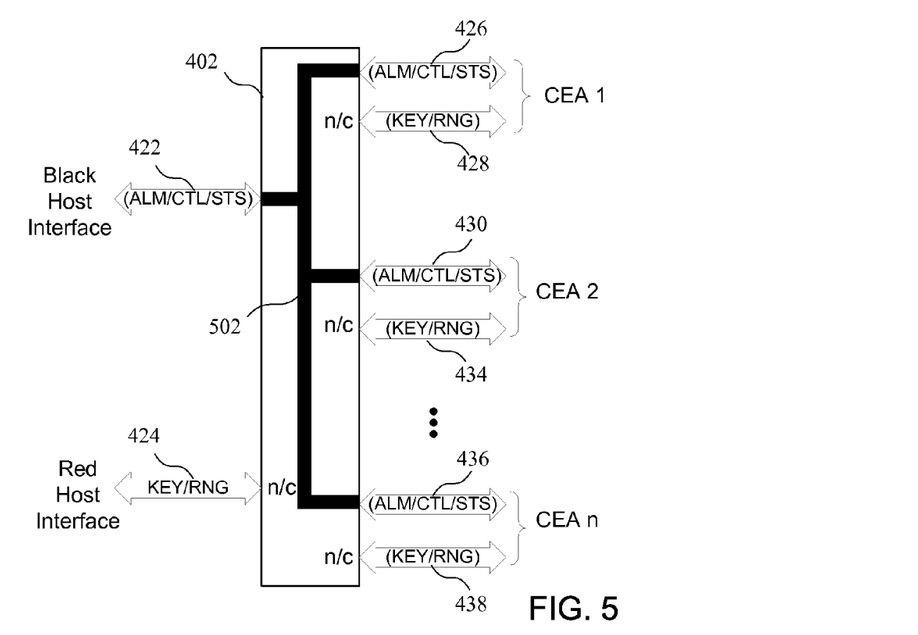
FIG. 5 is a block diagram showing a configuration of the circuit of FIG. 4 enabling non-secure communication with a plurality of cryptographic modules according to an embodiment of the present invention.
Figure 8:
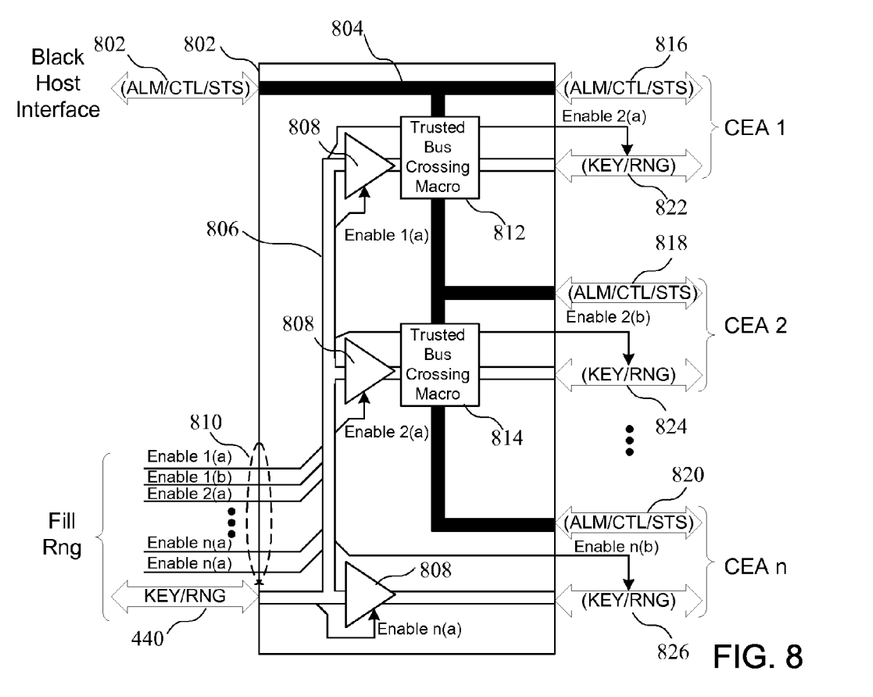
FIG. 8 is a block diagram of a circuit enabling communication of cryptographic data in an integrated circuit according to an alternate embodiment of the present invention.

Turning now to FIG. 8, a block diagram of a circuit enabling communication of cryptographic data in an integrated circuit according to an alternate embodiment of the present invention is shown. While the implementation of the CEA routing block as described in FIGS. 5-7 successfully enables transmitting secure and non-secure data in a cryptographic system, a disadvantage to the implementation of the circuit of FIG. 4 as described in FIGS. 5-7 is that there will be times when the black interface may need to transmit alarm, control, and status signals, but will not be connected to the host. For example, when a particular CEA detects an alarm condition, the appropriate actions, such as activating blocking gates, must take place immediately within that CEA. Although this would only be for short periods of time during which the new CEA routing block is being loaded and when secure data is being transferred to a particular CEA, it may be beneficial in certain circumstances to be able to selectively receive secure and non-secure data at the same time and without having to perform a partial reconfiguration of CEA routing block.

According to the embodiment of FIG. 8, a single module comprises pathways to and from the CEAs which are controlled by a number of enable control signals. As shown in FIG. 8, the CEA routing block 802 comprises a single hardware block which is always present and has a number of redundant enable signals to control the pathways to the CEAs. In addition to a non-secure data path 804 coupled to each of the CEAs, a secure path 806 is coupled to each CEA by way of an enabled buffer 808 which is selected to provide secure data to a single CEA in response to one of the enable signals 810. A new type of bus macro, the Trusted Bus Crossing Macro (TBCM), is provided to ensure that interconnect elements providing secure and non-secure data are configured according to predetermined criteria to maintain the integrity of the secure data. The TBCM macro is needed due to the two-dimensional routing problem when both secure and non-secure paths are present simultaneously, for example where the secure and non-secure paths must cross at an interconnect crossing. The TBCM ensures that interconnect elements having non-secure data and interconnect elements having secure data will cross on different metal layers. Additionally, the interconnect elements having non-secure data and interconnect elements having secure data may be required to be at 90° so that there is no danger of crosstalk between them. The locations of the remaining interconnect elements of the CEA routing block may be selected to ensure proper isolation. While the non-secure data path 804 provides non-secure data to the first, second and n-th CEA by way of non-secure data paths 816, 818 and 820, respectively, the secure data paths 822, 824 and 826 must be selected by an enable signal to provide data to the first, second and n-th CEA, respectively. According to one embodiment, only a single secure data path may be selected at a time if multiple CEAs are employed. This solution has the advantage of always having the black host Interface connected so there is no latency in sending alarm, status or control signals from a CEA to the host, while still maintaining the integrity of the system.

When employing the embodiments set forth above, it is a necessary requirement that all secure data be purged whenever communications with a particular CEA has completed. Periods processing is defined as the processing of various levels of classified and unclassified information at distinctly different times. Accordingly, the sub-system must be purged of all information from one processing period before transitioning to the next. Therefore, it is not necessary for the software running on a secure processor provide the separation function. The embodiments set forth above provide an embedded cryptographic system developer a means for more robust, less expensive, and quicker time-to-market implementation by allowing the burden of separation to rely upon the hardware reconfigurable nature of a device having programmable logic, and by performing periods processing after each secure CEA access. From this reduction in the level of complexity, it can be seen that Multiple Independent Levels of Security (MILS) is achievable without an exhaustive analysis of a high-assurance SOS.

Figure 9:
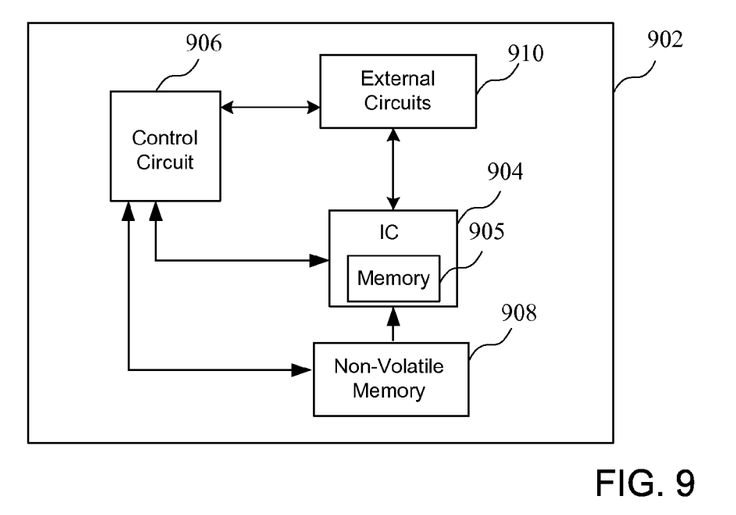
FIG. 9 is a block diagram of a system implementing an integrated circuit having a circuit enabling communication of cryptographic data according to an embodiment of the present invention.

Turning now to FIG. 9, a block diagram of a system implementing an integrated circuit having a circuit enabling communication of cryptographic data according to an embodiment of the present invention is shown. In particular, a system 902 comprises an integrated circuit 904 comprising a memory 905. The system 902 may comprises a circuit board, and the integrated circuit 904 may be the device having programmable logic of FIG. 1, for example, where the memory 905 comprises a volatile memory. A control circuit 906 is coupled to the integrated circuit 904 and a non-volatile memory 908. Configuration data from the non-volatile memory may be provided to the integrated circuit 904 to program the device as set forth above. The control circuit 906 and the integrated circuit 908 may interact with an external circuit 910, which may comprise other integrated circuits for example. According to one embodiment of the invention, the external circuits and/or control circuit may control the use of or interact with CEAs in the integrated circuit 904 to implement a cryptographic application.

Figure 10:
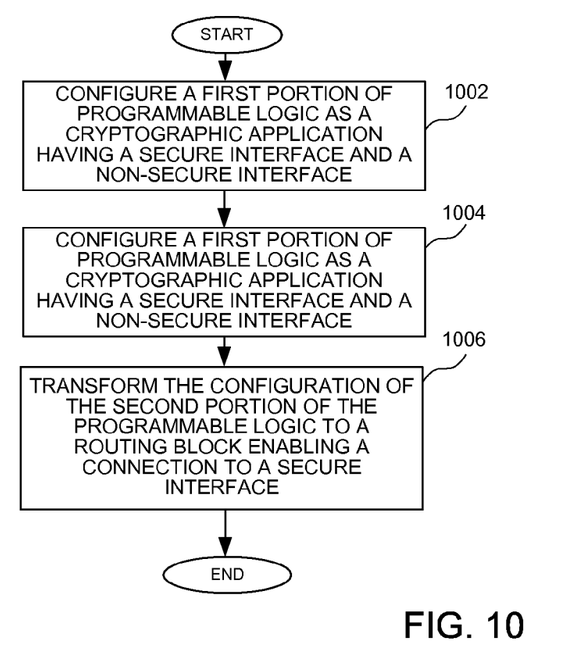
FIG. 10 is a flow chart showing a method of enabling communication of cryptographic data in an integrated circuit according to an embodiment of the present invention.

Turning now to FIG. 10, a flow chart shows a method of enabling communication of cryptographic data in an integrated circuit according to an embodiment of the present invention. The method of FIG. 10, as well as the methods of FIGS. 11 and 12 set forth below, may be implemented using any of the circuits as described above. In particular, a first portion of programmable logic is configured as a cryptographic application having a secure interface and a non-secure interface at a step 1002. A second portion of programmable logic is configured as a routing block coupled the cryptographic application, where the routing block enables a connection to the non-secure interface at a step 1004. The configuration of the second portion of the programmable logic is transformed to a routing block enabling a connection to a secure interface at a step 1006. The configuration of the second portion of the programmable logic may be continuously transformed as required to transfer secure or non-secure data to one or more CEAs according to the embodiments set forth above.

Figure 11:
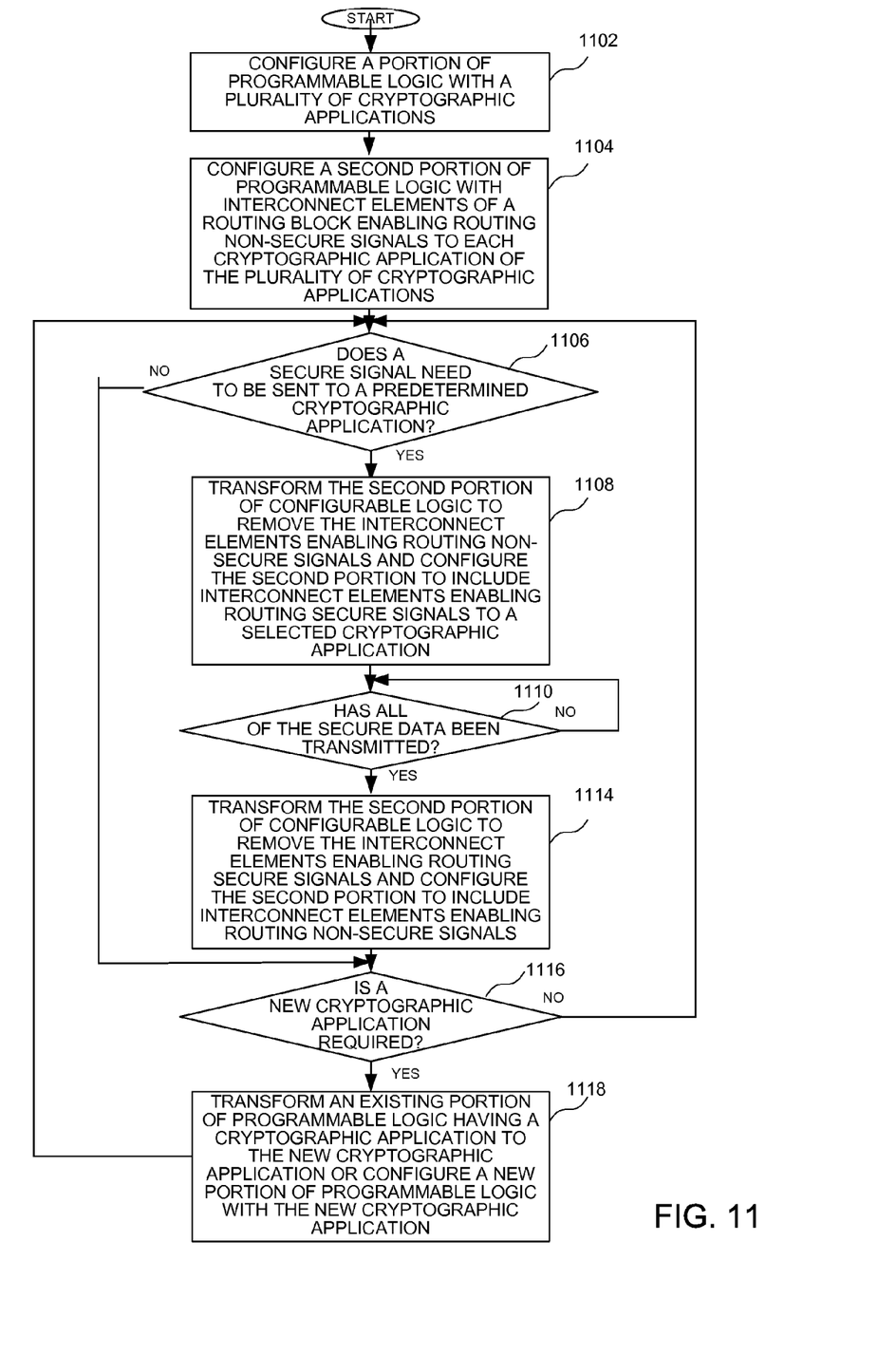
FIG. 11 is a flow chart showing a method of enabling communication of cryptographic data in an integrated circuit according to an alternate embodiment of the present invention.

Turning now to FIG. 11, a flow chart shows a method of enabling communication of cryptographic data in an integrated circuit according to an alternate embodiment of the present invention. A portion of programmable logic is configured with a plurality of cryptographic applications at a step 1102. A second portion of programmable logic is configured with interconnect elements of a routing block enabling routing non-secure data to each cryptographic application of the plurality of cryptographic applications at a step 1104. It is then determined whether a secure data needs to be sent to a predetermined cryptographic application at a step 1106. If so, the second portion of configurable logic is transformed to remove the interconnect elements enabling routing non-secure data and to configure the second portion to include interconnect elements enabling routing secure data to the predetermined cryptographic application at a step 1108. It is then determined whether all of the secure data has been transmitted at a step 1110. If so, the second portion of configurable logic is transformed to remove the interconnect elements enabling routing secure data and configured to include interconnect elements enabling routing non-secure data at a step 1112. The transformation of the second portion of programmable logic between CEA routing blocks for transmitting secure or non-secure data may be repeatedly performed as required to implement a cryptographic application. Finally, it is determined whether a new cryptographic application is required at a step 1114. If so, an existing portion of programmable logic having a cryptographic application is transformed to the new cryptographic application or a new portion of programmable logic is transformed to include the new cryptographic application at a step 1116.

Figure 12:
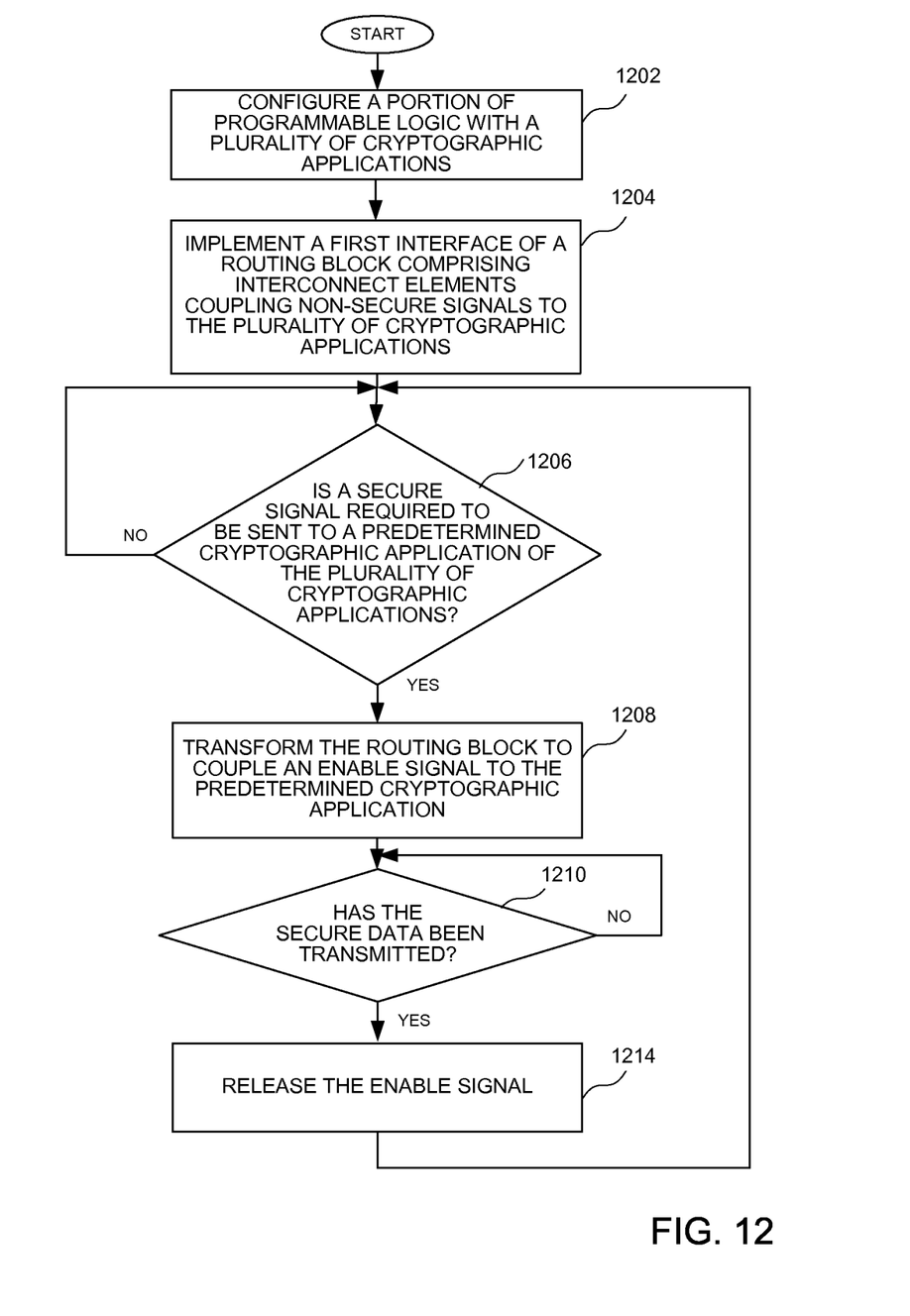
FIG. 12 is a flow chart showing a method of enabling communication of cryptographic data in an integrated circuit according to a further alternate embodiment the present invention.

Finally, turning to FIG. 12, a flow chart shows a method of enabling communication of cryptographic data in an integrated circuit according to a further alternate embodiment the present invention. A portion of programmable logic is configured with a plurality of cryptographic applications at a step 1202. A first interface of a routing block comprising interconnect elements coupling non-secure data to the plurality of cryptographic applications is implemented at a step 1204. It is then determined whether secure data is required to be sent to a predetermined cryptographic application of the plurality of cryptographic applications at a step 1206. The routing block is transformed by coupling an enable signal to the routing block to enable the transfer of secure data to the predetermined cryptographic application at a step 1208. It is then determined whether the secure data been transmitted at a step 1210. If so, the enable signal is released at a step 1212. According to the embodiment of FIG. 12, a circuit may transfer both secure and non-secure data at the same time while still maintaining the integrity of the secure data.

It can therefore be appreciated that the new and novel circuit for and method of enabling communication of cryptographic data in an integrated circuit has been described. It will be appreciated by those skilled in the art that numerous alternatives and equivalents will be seen to exist which incorporate the disclosed invention. As a result, the invention is not to be limited by the foregoing embodiments, but only by the following claims.

What is claimed is:

1. A circuit for enabling communication of cryptographic data in a programmable integrated circuit, the circuit comprising:
   a first input interface coupled to receive data having a first security level;
   a second input interface coupled to receive data having a second security level;
   a cryptographic application; and
   a routing block coupled between the first and second input interfaces and a first cryptographic application interface and a second cryptographic application interface of the cryptographic application, the routing block comprising programmable interconnect elements establishing a routing path between the first input interface and the first cryptographic application interface or the second input interface and the second cryptographic application interface, wherein the routing block is configurable responsive to first configuration bits to selectively route the data having the first security level between the first input interface and the cryptographic application by way of the routing block having a first configuration providing a first path between the first input interface and the first cryptographic application interface, and to route the data having the second security level between the second interface and the cryptographic application by way of the routing block having a second configuration providing a second path between the second input interface and the second cryptographic application interface, wherein the second configuration is enabled in response to second configuration bits provided in a partial reconfiguration of the integrated circuit if it is determined that the data having the second security level is to be routed by the second input interface, and the first path is eliminated in the second configuration to prevent data from being routed between the first input interface and the first cryptographic application interface while data is being routed from the second input interface to the second cryptographic application interface.

2. The circuit of claim 1 wherein the first input interface comprises a non-secure interface receiving non-secure data and wherein the second input interface comprises a secure interface receiving secure data having encryption keys.

3. The circuit of claim 1 further comprising a second cryptographic application, wherein the routing block is coupled between the first and second input interfaces and the second cryptographic application.

4. The circuit of claim 3 wherein the first and second cryptographic applications comprise partial reconfiguration modules implemented in configurable resources of a device having programmable resources.

5. The circuit of claim 4 further comprising a barrier around the first and second cryptographic applications, wherein the barrier prevents data other than data sent by way of the first input interface or the second input interface from being transmitted to the first and second cryptographic applications.

6. The circuit of claim 5 wherein the barrier comprises configurable resources around the first and second cryptographic applications, the interconnect elements of the configurable resources of the barrier being set to prevent signals from being transmitted to the first and second cryptographic applications.

7. The circuit of claim 4 wherein each of the first and second cryptographic applications comprises secure and non-secure inputs.

8. A circuit for enabling communication of cryptographic data in a programmable integrated circuit, the circuit comprising:

a plurality of cryptographic applications, each cryptographic application comprising a first interface receiving data having a first security level and a second interface receiving data having a second security level; and a routing block coupled to at least one first interface and at least one second interface of the plurality of cryptographic applications, the routing block comprising a plurality of enable circuits corresponding to the plurality of cryptographic applications, wherein the routing block is configurable responsive to first configuration bits to selectively route the data having the first security level between the first interface and a cryptographic application by way of the routing block having a first configuration providing a first path between the first interface and a first cryptographic application interface; and wherein the enable circuits enable simultaneously coupling the data having a first security level and the data having a second security level to at least one cryptographic application of the plurality of cryptographic applications if it is determined that the data having the second security level is to be routed by the at least one second interface.

9. The circuit of claim 8 further comprising interconnect elements, wherein interconnect elements coupled to the at least one first interface and interconnect elements coupled to the at least one second interface are configured on different metal layers.

10. The circuit of claim 8 further comprising interconnect elements, wherein interconnect elements coupled to the at least one first interface and interconnect elements coupled to the at least one second interface are configured to cross in the routing block perpendicular to one another.

11. The circuit of claim 10 wherein the interconnect elements coupled to the first interface and the interconnect elements coupled to the second interface are configured on different metal layers.

12. The circuit of claim 8 wherein the routing block comprises an interconnect crossing for each cryptographic application of the plurality of cryptographic applications, and wherein interconnect elements coupled to the non-secure interface and the secure interface of each cryptographic application are configured to cross at predetermined locations of the routing block to provide isolation.

13. A method of enabling communication of cryptographic data in a programmable integrated circuit, the method comprising:

configuring a first portion of programmable resources as a cryptographic application having a first input interface coupled to receive data having a first security level and a second input interface coupled to receive data having a second security level;

configuring a second portion of programmable resources as a routing block coupled to the cryptographic application, the routing block enabling a connection from the first input interface to a first cryptographic application interface of the cryptographic application; and transforming the configuration of the second portion of the programmable resources to enable a connection from the second input interface to a second cryptographic application interface of the cryptographic application if it is determined that the data having the second security level is to be routed by the second input interface, wherein the transformation of the configuration of the second portion is performed in response to configuration bits associated with the second portion of the programmable resources and provided during a partial reconfiguration of the integrated circuit, and wherein a path of the routing block enabling a connection from the first input interface to the first cryptographic application interface is eliminated in the second configuration to prevent data from being routed between the first input interface and the first cryptographic application interface while data is being routed from the second input interface to the second the cryptographic application interface.

14. The method of claim 13 wherein transforming the configuration of the second portion of the programmable resources comprises reconfiguring the routing block from an interface for non-secure data to an interface for secure data.

15. The method of claim 13 further comprising transforming the cryptographic application by reconfiguring the cryptographic application.

16. The method of claim 13 further comprising configuring a third portion of programmable resources as a second cryptographic application.

17. The method of claim 16 wherein transforming the configuration of the second portion of the programmable resources comprises controlling enable signals coupled to the first cryptographic application and the second cryptographic application.

\* \* \* \* \*